United States Patent
Wang

(10) Patent No.: US 6,639,032 B2
(45) Date of Patent: Oct. 28, 2003

(54) HIGHLY BRANCHED POLYMER FROM TELOMERIZATION

(75) Inventor: Jin-Shan Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/995,948

(22) Filed: Nov. 28, 2001

(65) Prior Publication Data

US 2003/0158357 A1 Aug. 21, 2003

(51) Int. Cl.$^7$ .................................................. C08F 4/06
(52) U.S. Cl. ..................... 526/135; 526/145; 526/146; 526/147; 526/185; 526/217; 526/237; 526/238; 528/85; 528/271
(58) Field of Search .................................. 526/135, 145, 526/146, 147, 89, 185, 217, 237, 238; 528/85, 271

(56) References Cited

U.S. PATENT DOCUMENTS

| | | |
|---|---|---|
| 2,396,786 A | 3/1946 | Handford |
| 5,041,516 A | 8/1991 | Frechet et al. |
| 5,418,301 A | 5/1995 | Hult et al. |
| 5,587,441 A | 12/1996 | Frechet et al. |
| 5,587,446 A | 12/1996 | Frechet et al. |
| 5,807,937 A | 9/1998 | Matyjaszewski et al. |

OTHER PUBLICATIONS

Charles M. Starks, "Free Radical Telomerization", Academic Press, New York, 1974, pp. 4–11.
Bernard Boutevin et al, "Telomerization", Comprehensive Polymer Science, Pergamon, Oxford, 1991, vol. 3, pp. 185–194.
Paul J. Flory; "Molecular Size Distribution In Three Dimensional Polymers. VI. Branched Polymers Containing A–R–B$_{f-1}$ Type Units"; J. Amer. Chem. Soc.; 1952; vol. 74; pp. 2718–2723.
C. J. Hawker et al; "One–Step Synthesis Of Hyperbranced Dendritic Polyesters"; J. Amer. Chem. Soc.; 1991; vol. 113; pp. 4583–4588.
Axel H. E. Muller et al, "Hyperbranched Methacrylates By Self–Condensing Group Transfer Polymerization", Polymer Preprint, 1997, vol. 38(1), pp. 498–499.

*Primary Examiner*—Tatyana Zalukaeva
(74) *Attorney, Agent, or Firm*—Andrew J. Anderson

(57) ABSTRACT

A process for making hyperbranched polymers from $A_n$—$L_z$(XY)$_m$ type monomers wherein A is a polymerizable group moiety, XY is a telogen group moiety in which Y is a transferable atom or group which can participate in a transfer reaction with the formation of reactive X*, L is a linkage between A and XY, z is 0 or 1, and n and m are integers of at least 1, comprising: (a) initiating reaction by forming activated species from reaction between either an A or an XY group of the $A_n$—$L_z$(XY)$_m$ type monomer and an external stimulus to form activated monomer species with an activated polymerizable group moiety A* or an activated moiety X* derived from the telogen group moiety XY; and (b) polymer segment chain growth by (i) propagation reaction between the polymerizable group A moieties of the $A_n$—$L_z$(XY)$_m$ type monomers with the activated moieties A* and X* of activated species, and further reaction between the polymerizable group moieties with the activated moieties of the reaction products thereof, and (ii) chain transfer reaction between the activated A* polymerizable group moieties of activated species or of polymer segments formed in (b)(i) with XY telogen group moieties of the $A_n$—$L_z$(XY)$_m$ type monomers or of polymer segments formed in (b)(i), whereby activated X* moieties and inactive A—Y moieties are formed by transfer of transferable atom or group Y of the telogen group moiety XY to the activated A* moiety.

15 Claims, No Drawings

HIGHLY BRANCHED POLYMER FROM TELOMERIZATION

FIELD OF THE INVENTION

The present invention generally relates to the synthesis of commodity and specialty polymeric materials. Specifically, the present invention relates to manufacture of polymers with hyperbranched architecture from telomerization.

BACKGROUND OF INVENTION

Highly branched polymers and copolymers have attracted considerable attention over the past decades, since many advanced materials with new or improved properties can be obtained therefrom. The terms "hyperbranched" and "highly branched" used herein with respect to branched polymers are intended to designate polymers having a relatively high percentage of propagated branching sites per number of polymerized monomer units, e.g. at least one branching site per every ten monomer units, preferably at least one branching site per every five monomer units and more preferably at least one branching site per every three monomer units. Highly branched polymers can be made by multi-step or one step processes. Multi-step generation processes were exemplified by Frechet in U.S. Pat. No. 5,041,516 and by Hult in U.S. Pat. No. 5,418,301. Both patents described that the highly branched polymers known as dendrimer or "starburst polymer" were made through a series of growth steps consisting of repeatedly reacting, isolating, and purifying.

One-step process was first conceptualized by Flory (J. Am. Chem. Soc., 74, p2718 (1952)) who demonstrated by theoretical analysis that highly branched and soluble polymers could be formed from monomers comprising the structure $AB_2$, where A and B are reactive groups, by one-step condensation polymerization. In contrast to dendrimers, the polymer formed by $AB_2$ polymerization is randomly branched.

Frechet et al disclosed that vinyl hyperbranched polymers could be obtained by means of living chain polymerization of AB monomers (Frechet et al. U.S. Pat. Nos. 5,587,441, 5,587,446), which was termed as self-condensation vinyl polymerization. AB monomer was defined as one that contains two reactive groups, A and B, in the same molecule, which react independently of each other within a molecule. The A group is typically a polymerizable vinyl group and the B group is a reactive group that can be activated by an activator and add to the A group to promote the polymerization. The general mechanism of formation of hyperbranched polymer can be described in accordance with Scheme 1 below, where the A group is a polymerizable vinyl group.

Scheme 1

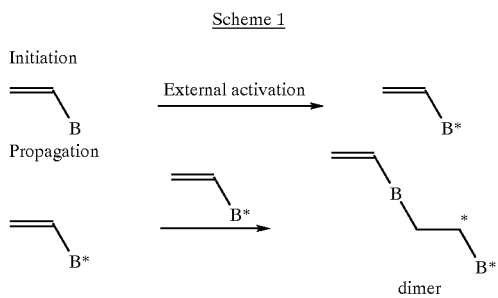

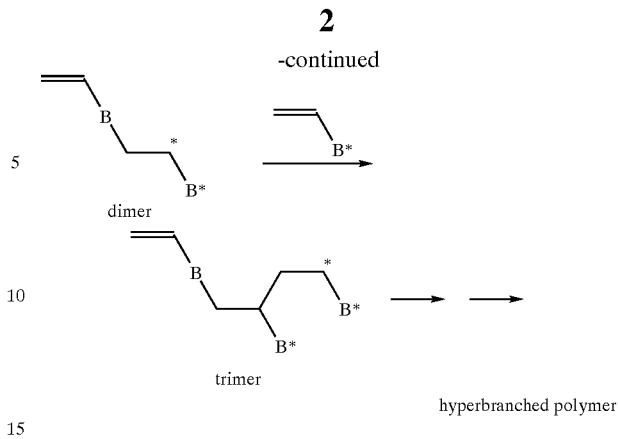

As indicated in Scheme 1 above, B with AB vinyl monomer, a B group may be activated to a B* moiety that itself is capable of initiating the polymerization of a vinyl monomer. The polymerization process is initiated by reaction of one initiating B* group with the double bond A of another AB* monomer unit to yield the dimer. The dimer now has one vinyl group and two reactive sites, and subsequently functions like an $AB_2$-monomer. Additional condensation of dimer, trimer, and eventually larger oligomeric species produced by sequential condensations gives rise to a hyperbranched polymer. The polymerization of AB monomer described by Frechet displays a "living-like" character, as side reactions such as chain transfer and elimination are substantially eliminated. Based on the same mechanism as Frechet's, a number of vinyl hyperbranched polymers have been prepared by various living polymerization processes, such as atom transfer radical polymerization (Wang, et al. U.S. Pat. No. 5,807,937 (1998)), group transfer polymerization (Muller, et al. Polymer Preprint, 38(1), 498 (1997)), and stable radical polymerization (Hawker et al. J. Am. Chem. Soc. 113, 4583 (1991)).

There are, however, disadvantages associated with the polymerization processes described in the prior art for the manufacture of vinylic hyperbranched polymers by living polymerization processes. First, in the cases of living anionic, cationic, and group-transfer polymerization, the polymerizations systems need to be very pure. In the case of living cationic and group transfer polymerization, e.g., a trace of impurity such as water often prevents polymerization from proceeding, so often that there is even no polymer obtained. Thus, these living polymerization processes are not preferred in industrial productions. Second, the use of heavy metal containing inorganic salts in atom transfer radical polymerization is not environmentally friendly and practical.

In 1946, Handford first defined telomerization as the reaction between a compound XY called the telogen and one or several molecules of polymerizable species M called the taxogen, under polymerization conditions which lead to the formation of telomers $X—(M)_n—Y$ (U.S. Pat. No. 2,396, 786). Telomerization is generally regarded as chain reaction that, in contrast to polymerization, leads to oligomers having very low molecular weight, and even monoaddition compounds, which are referred to as telomers. The general mechanism of formation of telomer can be described in accordance with Scheme 2 below.

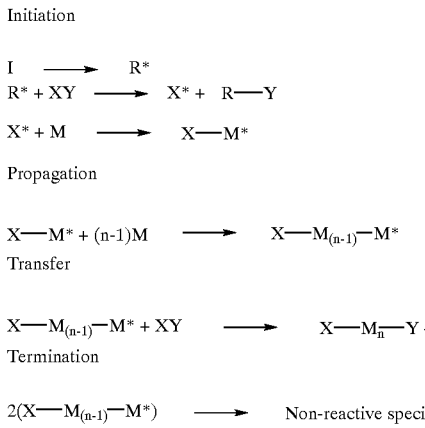

Initiation

I ⟶ R*

R* + XY ⟶ X* + R—Y

X* + M ⟶ X—M*

Propagation

X—M* + (n-1)M ⟶ X—M$_{(n-1)}$—M*

Transfer

X—M$_{(n-1)}$—M* + XY ⟶ X—M$_n$—Y + X*

Termination

2(X—M$_{(n-1)}$—M*) ⟶ Non-reactive species

In Scheme 2, Initiator I (e.g., a peroxide, a peracid, or a diazoic compound) generates activated species R* (e.g., free radical group). R* then reacts with telogen XY to form activated species X* and R—Y. X* can then react with taxogen M monomer to form species X—M*, which can react with further M monomers through propagation to form oligomeric species X—M$_{(n-1)}$—M*. X—M$_{(n-1)}$—M* species upon transfer reaction with telogen XY forms telomer X—M$_n$—Y and activated species X*, which can then initiate further telomerization. The reaction can terminate by combination of two X—M$_{(n-1)}$—M* and/or X—M* species to form non-activated species. The average degree of chain growth (n) in telomerization is generally from 2 to about 100, more typically 2 to 30, or even 2 to 10, dependent upon the relative reaction rates for the propagation and chain transfer steps. Telomerization generally requires that the chain growth (propagation) and chain transfer steps have reaction rates within two orders of magnitude of each other, as if the propagation reaction rate is too fast relative to the chain transfer reaction rate, regular polymerization will occur. If the chain transfer reaction rate is significantly faster than the propagation reaction rate, on the other hand, a 1:1 adduct (i.e., X—M—Y) will be obtained.

The telomerization products can thus be classified as intermediate between organic monomeric and macromolecular polymeric compounds and have been found in wide industrial applications (Stark, Free Radical Telomerization, Academic Press, Inc., New York, 1974; Boutevin et al, in Comprehensive Polymer Science, Pergamon: Oxford, 1991, vol. 3, p 185). However, no prior art discloses the synthesis of hyperbranched polymer by telomerization.

It would be desirable to provide a simple, practical, and environmentally friendly process for the manufacture of soluble hyperbranched polymers. Accordingly, one object of the present invention is to make hyperbranched polymers by telomerization.

SUMMARY OF THE INVENTION

The invention comprises a process for making hyperbranched polymers from $A_n$—$L_z(XY)_m$ type monomers wherein A is a polymerizable group moiety, XY is a telogen group moiety in which Y is a transferable atom or group which can participate in a transfer reaction with the formation of reactive X*, L is a linkage between A and XY, z is 0 or 1, and n and m are integers of at least 1, comprising (a) initiating reaction by forming activated species from reaction between either an A or an XY group of the $A_n$—$L_z(XY)_m$ type monomer and an external stimulus to form activated monomer species with an activated polymerizable group moiety A* or an activated moiety X* derived from the telogen group moiety XY; and (b) polymer segment chain growth by (i) propagation reaction between the polymerizable group A moieties of the $A_n$—$L_z(XY)_m$ type monomers with the activated moieties A* and X* of activated species, and further reaction between the polymerizable group moieties with the activated moieties of the reaction products thereof, and (ii) chain transfer reaction between the activated A* polymerizable group moieties of activated species or of polymer segments formed in (b)(i) with XY telogen group moieties of the $A_n$—$L_z(XY)_m$ type monomers or of polymer segments formed in (b)(i), whereby activated X* moieties and inactive A—Y moieties are formed by transfer of transferable atom or group Y of the telogen group moiety XY to the activated A* moiety;

wherein the reaction rates of the (b)(i) propagation reaction and of the (b)(ii) chain transfer reaction are within 2 orders of magnitude of each other, more preferably within one order of magnitude of each other, such that the combination of propagation reaction and chain transfer reaction results in formation of a highly branched polymer from the $A_n$—$L_z(XY)_m$ type monomer.

The present invention provides a process which is adaptable to manufacture of hyperbranched materials with existing scale-up and commercialization facilities, and which may rely upon readily available starting materials and catalysts. The present invention provides a process by which a broad variety of functional hyperbranched polymers may be obtained, a process for making hyperbranched polymers in which a broad variety of macro-initiators may be employed, and enables the manufacture of hyperbranched polymers useful in a wide variety of known and novel applications.

BRIEF DESCRIPTION OF PREFERRED EMBODIMENTS

The present invention discloses a new process to make hyperbranched polymers and related products by means of telomerization reaction of $A_n$—$L_z(XY)_m$ type of monomers where A is a polymerizable group and XY is a telogen-like moiety in which Y is a transferable atom or group which can participate in a transfer reaction with the formation of reactive X*, L is a linkage between A and XY, z is 0 or 1, and n and m are integers of at least 1, preferably 1 to 2, and most preferably n is 1 and m is 1 or 2. For ease of reference purposes the terms "A—XY type monomer" or "A—XY monomer" may be used in the description of the invention in reference to such monomers, without intent to limit such reference to monomers having only a single A group and single XY group. Where the present invention is described in the context of use of A—XY type monomers which comprise a single polymerizable group A and a single telogen group XY for simplicity purposes, it will be understood by the artisan that the A—XY type monomer employed in accordance with the present invention may be selected from compounds which may have multiple A and/or XY groups in accordance with the general formula above.

While not intending to be limited to any particular initiating/catalyst systems or monomers, the synthesis of hyperbranched polymer via telomerization of A—XY monomer can be understood by the following discussion.

Similar to other types of chain polymerization processes, the telomerization of A—XY monomers will typically include the steps of initiation, chain growth, chain transfer, and termination.

Initiation

In this step, the initiating species A*—XY or A—X* is formed from reaction between either A moiety or XY group and an external stimulus:

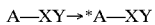

where Y' is an inactive species derived from transferable group Y.

Propagation

The first step of the chain growth begins with addition of the initiating species A*—XY or A—X* with monomer A—XY or A—X*:

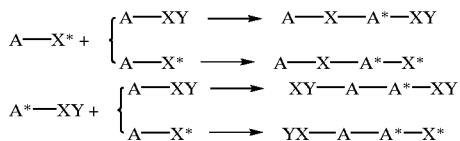

Hyperbranched polymer is subsequently formed by reacting above -described active species with the A groups in either additional monomer or of growing polymer segments:

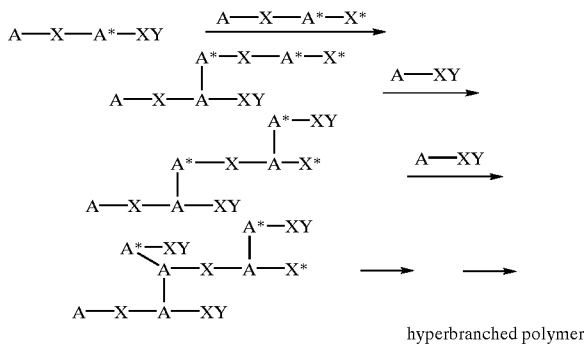

Chain Transfer

Similarly as in telomerization as described in the prior art, the process of the invention includes a chain transfer reaction between activated polymerizable group moieties of polymer segments with telogen group XY moieties whereby activated X* moieties and deactivated polymerizable group moieties are formed by transfer of transferable atom or group Y of the telogen group moiety XY to the activated polymerizable group moiety, wherein the reaction rates of the propagation and chain transfer reactions are within 2 orders of magnitude of each other, more preferably within one order of magnitude of each other. Both growth and transfer may be either very fast or very slow; the absolute rate is not limiting as it is only the ratio of growth to transfer which is accountable for the formation of hyperbranched polymer.

Termination

In the present process, termination reactions may also often occur along with the propagation and chain transfer reactions during the course of telomerization. Similarly as in prior art telomerization processes, termination reaction may result from combination of two activated moiety species to form non-activated species. While termination reactions may occur to some extent, chain transfer reaction in the process of the invention desirably should be faster than termination reaction to the point that excessive crosslinking reactions are avoided so that soluble polymers may be obtained.

The polymers which result from the present process are clearly different from those that result from conventional telomerization of M monomers in the presence of separate telogen XY. In present process, the telogen-like XY group is part of the monomer and consequently the resultant hyperbranched polymer is composed of X in the backbone as part of repeating monomeric units and multi-functional Y at the ends, whereas the conventional telomerization only yields telomer containing X and Y at each end of the telomer. Also, the hyperbranched polymer may possess multi-functional XY moiety, whereas there is no XY moiety in conventional telomer.

The present process is also clearly distinguished from "living" polymerization of AB type monomers, where both A and B of AB monomer are required to be able to be reversibly activated and deactivated and wherein reactants and catalysts are uniquely selected so as to maximize the rate of propagation reaction relative to chain transfer and termination reactions. In comparison to living polymerization of AB monomers, the present invention can advantageously yield hyperbranched polymers under conventional telomerization conditions employing less restrictive reactant and catalysts selection criteria. While the telomerization chain transfer reaction between —A* and —XY moieties yields an —A—Y moiety which is a "dead" species that is not further reactivated (unlike the reactions in living polymerization process of AB monomer), as the XY telogen group moieties in accordance with the invention process are part of the reactant monomer or a subsequently grown polymer segment, the chain transfer reaction does not necessarily end growth of polymer chain segments as in the prior art telomerization process, but rather transfers subsequent growth to branching at the X* site which is created by the chain transfer reaction. A sufficiently fast chain transfer reaction between active species —A* and —XY moieties (relative to propagation and termination reactions) in the present invention leads to the generation of multi-functional active centers and subsequently of hyperbranched polymer without forming insoluble cross-linked polymers. In comparison to living polymerization of AB monomers, the present invention can advantageously yield hyperbranched polymers under conventional telomerization or "non-living" polymerization conditions.

In addition to the actual structure of the A—XY type monomer, the relative reaction rates between the propagation, chain transfer and termination reactions which may occur in the process of the invention can be affected by (but not limited to) the following polymerization conditions: the reactivity and concentration of comonomer(s); the reactivity of catalyst; the concentration of catalyst; the concentration of monomer; polymerization temperature; polymerization pressure; polymerization time; polymerization equipment; polymerization technology; monomer addition method and sequence; the solvent; the additives; the mixing methods. Combinatorial chemistry and experimental design can be used to explore and optimize suitable catalyst system and experimental conditions for telomerization in accordance with the present invention, in combination with selection of suitable monomer structure for obtaining hyperbranched polymer materials with desired properties.

While for simplicity the present invention is primarily described in the context of use of A—XY type monomers which comprise a single polymerizable group A and a single telogen group XY, the A—XY type monomer employed in accordance with the present invention may be selected from any compound having the following formula:

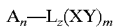

wherein A is a polymerizable group, XY is a telogen group in which Y is a transferable atom or group which can participate in any transfer reaction with the formation of reactive X*, L is a linkage between A and XY, z is 0 or 1, and n and m are integers of at least 1, preferably 1 to 2, and most preferably n is 1 and m is 1 or 2.

In a preferred embodiment, the A group is any one that may undergo chain polymerization/telomerization such as those described in Principle of Polymerization (Ordian). They may include, but are not limited to, vinylic, cyclic ether, siloxane, and cyclic imino ether groups. In a preferred embodiment, the A group is selected from one of the following formula:

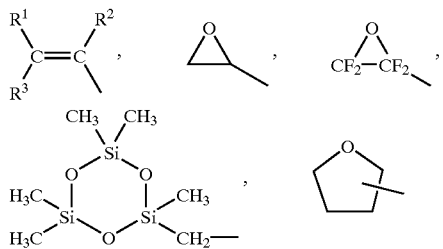

wherein $R^1$, $R^2$ and $R^3$ are independently selected from the group consisting of H, halogen, CN, straight or branched $C_1$–$C_{20}$ alkyl and $C_6$–$C_{20}$ aryl that may be substituted with halogen. In a particularly preferred embodiment, the A group has the formula:

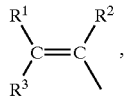

wherein $R^1$, $R^2$ and $R^3$ are as defined above. In a most preferred embodiment, the A group has the formula: $CH_2=CH-$.

The —XY group is a telogen-like group with Y being a transferable atom or group such as described in Free Radical Telomerization (Stark) and other prior art telomerization processes. The —XY moiety is required to be capable of forming —X* by any means such as heat, light, electron beam/radiation, microwave, or by reacting —XY with an external active moiety such as an anion, a cation, a radical, or other activation source. In order to form hyperbranched polymer in the present process, the resultant —X* must be capable of reacting with above-described A polymerizable group of to form a new active species —X—A*.

The transferable atom or group Y may be, e.g., H, halogen (i.e., F, Cl, Br, I), $Li^+$, $Na^+$, $K^+$, $Cs^+$, $OC=NC_6H_4S$, $(Ph)_2R^4C$ (where $R^4$=CN, OPh, OSiMe$_3$), $R^5$ (where $R^5$=alkyl, aryl), $(R^5)_2NC(=S)-S$, $VR^5$ (where V=Se, Te), $R^5S$, $OR^5$, $Si(R^5)_3$, or $O-N(R^6)_2$ (where the two $R^6$ groups may be independently alkyl or aryl, or may be joined to form a heterocyclic ring). In a more preferred embodiment, Y is H, Cl or Br, and most preferably Cl or Br.

The telogen group —XY may be, e.g., —OM (where M is H, $Li^+$, $Na^+$, $K^+$, $Cs^+$), —$CZ_3$( where Z=Cl, Br, I), —$CF_2Z$, —$CCl_2Br$, —$CBr_2Cl$, —OC(O)$CZ_2$, —C(O)—$Z_2$, —$CH_{2-q}Z_q$(where q is an integer of 0–2), —C(O)$CH_{2-q}Z_q$, —C(O)OCH$_{2-q}Z_q$, —OC(O)CH$_{2-q}Z_q$, —SO$_2$Cl, $(R^5)_2$NC(=S)—S—C(=S)N($R^5$)$_2$—, $R^5$S—S$R^5$—, $(R^5)_2$NC(=S)—S—$R^5$—, $R^5$S—$R^5$—, —$R^5$—O—N($R^6$)$_2$. In most preferred embodiments, XY is selected from the group consisting of —OH, —CCl$_3$, —CBr$_3$, —CCl$_2$Br, —CBr$_2$Cl, —OC(O)CBr$_2$, —OC(O)CCl$_2$.

L is a linking group, which may be selected, e.g., from any of further substituted or unsubstituted straight or branched alkyl, alkylene, and aryl group. Representative possible substituents include halogen and CN. In a preferred embodiment, L is selected from: —(CH$_2$)$_{1-21}$—, —OC(O)(CH$_2$)$_{0-10}$—, —C(O)(CH$_2$)$_{0-10}$—, —O—, —C(O)O—(CH$_2$)$_{0-10}$—, —C(O)O(CH$_2$)$_2$N(CH$_3$)—, —C(O)N($R^7$)— (where $R^7$=H, alkyl), —C$_6$F$_4$—;

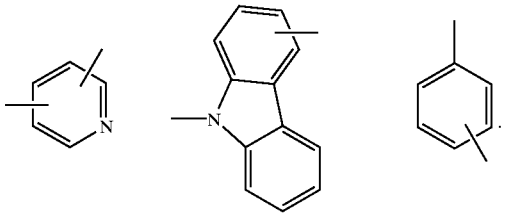

In another embodiment, L may be selected from any of oligomer or polymer chains derived from any kinds of polymerizable monomers. In a more preferred embodiment, L may be a polystyrene, polyolefin, polyisobutylene, salt or ester of poly(meth)acrylic acid chain with molecular weight from 200 to 20,000.

In another more preferred embodiment, L may be selected from any of oligomer or polymer chains having the following repeating units:

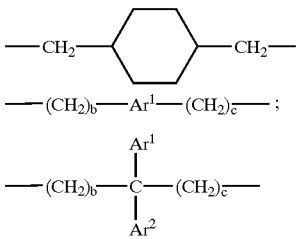

wherein b and c are integers of 0 to 18, $Ar^1$ and $Ar^2$ are independent aryl selected from phenyl, naphthyl, biphenyl, which may be substituted with $C_1$–$C_6$ alkyl, $C_1$–$C_6$ alkoxy, halo, or acetoxy.

In still another more preferred embodiment, L is selected from any of oligomer or polymer chains having the following repeating units:

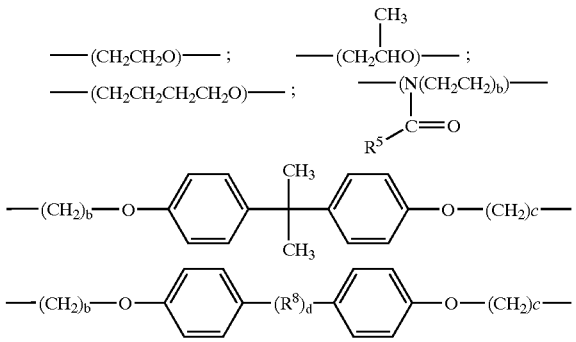

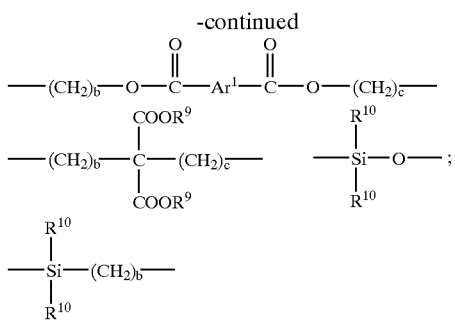

wherein d is equal 0 or 1, $R^8$ is selected from any group consisting of O, S, $SO_2$, $CH_2$, or CO; and $R^9$ is H, aryl and straight or branched $C_1-C_{20}$ alkyl which may be substituted with halogen, and $R^{10}$ is aryl and straight or branched $C_1-C_{20}$ alkyl.

The present invention may be carried out with any conventional chain polymerization catalyst or the activated moieties in present process may be generated by using known sources such as heat, light, electron beam/radiation, microwave, such that the polymerization may be carried out by any conventional mechanism such as cationic, anionic, radical, and ring-opening. In a preferred embodiment of the invention, the activated species formed in step (a) comprise free radical groups and the polymerization proceeds by free radical polymerization. Any catalyst or initiating system that is well known in the art of chain polymerization such as those described in Principles of Polymerization, $3^{rd}$ Ed, by Ordian (Wiley) and which does not induce living polymerization process is suitable for use in the present invention. Examples of these catalysts or initiating systems are but not limited those as described following.

Radical initiators can be generated by such methods as thermally induced homolytic scission of a suitable compound or compounds (thermal initiators such as peroxides, peroxyesters, or azo compounds), the spontaneous generation from polymerizable group (e.g., styrenics), redox initiating systems, photochemical initiating systems or high energy radiation such as electron beam, X- or gamma-radiation. Examples of thermal initiators are one or more of the following compounds: 2,2'-azobis(isobutyronitrile), 2,2'-azobis(2-cyano-2-butane), dimethyl 2,2'-azobisdimethylisobutyrate, 4,4'-azobis(4-cyanopentanoic acid), 1,1'-azobis(cyclohexanecarbonitrile), 2-(t-butylazo)-2-cyanopropane, 2,2'-azobis(2-methyl-N-1,1-bis(hydroxymethyl)2-hydroxyethyl)propionamide, 2,2'-azobis(N,N'-dimethyleneisobutyramine)dihydrochloride, 2,2'-azobis(2-amidinopropane)dihydrochloride, 2,2 '-azobis(N, N'-dimethyleneisobutyramine), 2,2 '-azobis(2-methyl-N-[1, 1-bis(hydroxymethyl)-2-hydroxyethyl]propionamide), 2,2'-azobis(2-methylpropane), t-butyl peroxyacetate, t-butyl peroxybenzonate, t-butyl peroxyoctoate, t-butyl peroxyneodecanoate, t-butyl peroxyisobutyrate, t-butyl peroxypivalate, t-amyl peroxypivalate, di-isopropyl peroxydicarbonate, dicyclohexyl peroxydicarbonate, dicumyl peroxide, dibenzoyl peroxide, dilauroyl peroxide, potassium peroxyldisulfate, ammonium peroxydisulfate, di-t-butyl hyponitrite, dicumyl hyponitrite. Examples of photochemical initiator systems are one or more of the following benzoin derivatives, benzophonenone, acyl phosphite oxides, and photoredox system. Examples of redox initiator systems can include combinations of the following oxidants and reductants. Oxidants: sodium peroxydisulfate, potassium peroxydisulfate, hydrogen peroxide, t-butyl hydroperoxide. Reductants: iron (II), titanium (III), potassium thiosulfite, sodium, potassium bisulfite. Other redox initiating system may be those organic-inorganic redox pairs which may include: 1), oxidation of thiol compound combined with $Fe^{3+}$, $Ce^{4+}$, $BrO_3^-$ and $S_2O_8^{2-}$ containing inorganic compounds; 2), oxidation of aldehydes and ketones by $Ce^{4+}$ and $V^{5+}$, 3), oxidation of oxalic, malonic, and citric acids by permanganate and $Mn^{3+}$; 4) transitional metal chelates, organometallic derivatives of transition metals in low oxidation states.

Cationic telomerization initiators are selected from those which can bring about the telomerization of monomers with electron-releasing substitutents. Examples of cationic telomerization initiators are those as described in the following. Protonic acids may be selected from those very string protonic acids such as concentrated sulfuric acid, trifluoroacetic acid, fluorosulfuric acid, and trifluoromethane sulfonic acid. A variety of Lewis acids can be used in the present invention. Examples of these Lewis acid are metal halides such as $AlCl_3$, $BF_3$, $SnCl_4$, $SbCl_5$, $ZnCl_2$, $TiCl_4$, $PCl_5$; organometallic derivatives such as $R^{19}AlCl_2$, $R^{19}_2AlCl$, $R^{19}_3Al$, $R^{19}ZnOZnR^{19}$, $R^{19}_2AlOAlR^{19}_2$ (where $R^{19}$ is alkyl, haloaklyl); and oxyhalides such as $POCl_3$, $CrO_2Cl$, $SOCl_2$, $VOCl_3$; oxonium ions such as $Et_3O(BF_4)$. Initiation by Lewis acids either requires or proceeds faster in the presence of either a donor such as water, alcohol, and organic acid, or a cation donor such as t-butyl chloride or triphenylmethyl fluoride. Other cationic systems may include acetyl perchlorate, iodine, electrolytic initiation, and ionizing radiation.

A variety of basic initiators can be used in the present invention to initiate anionic telomerization of T—M monomers. These include but not limited to covalent and ionic metal amides such as Li(Na, K)$NH_2$, Li(Na, K)$NEt_2$, alkoxides and phenoxides such as $R^{20}OLi$ (Na, K) (where $R^{20}$ is alkyl, aryl), hydroxides such as Li (Na, K)OH, cyanides, phophines, and amines, organometallic compounds such as $R^{19}Li$, $R^{20}MgX'$ (X' is halogens).

The Zigler-Natta catalysts can also be used in the present invention. These encompass literally thousands of different combinations of a Group I–III organometallic compound (or hydride) and a compound of a Group IV–VIII transition metal such as those described in Principles of Polymerization, $3^{rd}$ Ed, by Ordian (Wiley).

Metallocene-based catalytic systems can be used in the present invention. Examples are those systems composed of a metallocene and an alumoxane.

Late metal catalysts developed by Brookhart and others can also be used in the present invention. These catalysts are usually composed of complexes of Ni or Pd or other late metal with chelating agents such as diimines (Johnson, J. Am. Chem. Soc. 117, 6416 (1995)).

The present telomerization process may be conducted in the absence of solvent known as bulk polymerization. However, it can be also carried in any solvent, which might include but not limited to ethers, cyclic ethers, alkanes, cycloalkanes which may be substituted, aromatic solvents, halogenated hydrocarbon solvents, acetonitrile, dimethylformamide, ethylene carbonate, dimethylsulfoxide, dimethylsulfone, alcohol, water, mixture of such solvents, and supercritical solvents such as carbon dioxide, alkanes in which any H may be replaced with F, etc. The present telomerization may also be conducted in accordance with known suspension, emulsion, microemulsion, gas phase, dispersion, precipitation, template, reactive injection molding, phase transfer polymerization processes and the like. Polymerization can be terminated by any known conventional methods.

The polymerization can be conducted in accordance with known batch, semi-batch, continuing processes and the like. The polymerization temperature can generally be varied from −100 to 200° C. and polymerization pressure from $10^{-8}$ atm to $10^3$ atm. Combinatorial chemistry and experimental design can be used in the context of the present invention to optimize the polymerization reaction conditions.

The molecular weight and molecular distribution of polymers prepared with present invention typically will be from 100 to $10^6$ and from 1.001 to 100, respectively. The final polymers can be purified with known processes such as precipitation, extraction, and the like. Polymers can be used in the forms of solid particle, solution, dispersion, latex, and the like.

In a preferred embodiment, the present invention provides a process to make copolymers from co-telomerization of two or more than two A—XY type monomers or from co-telomerization of A—XY type monomer with "ordinary" monomer including macromonomer.

The preferred "ordinary" monomers include carboxyl group-containing unsaturated monomers such as acrylic acid, methacrylic acid, crotonic acid, itaconic acid, maleic acid, fumaric acid, and the like(preferably methacrylic acid), $C_{2-8}$ hydroxyl alkyl esters of (meth)acrylic acid (preferably methacrylic acid) such as 2-hydroxylethyl (meth)acrylate, 2-hydroxylpropyl (meth)acrylate, 3-hydroxypropyl (meth)acrylate, hydroxybutyl (meth)acrylate and the like, monoesters between a polyether polyol (e.g., polyethylene glycol, polypropylene glycol or polybutylene glycol) and an unsaturated carboxylic acid (preferably methacrylic acid); monoethers between a polyether polyol (e.g., polyethylene glycol, polypropylene glycol or polybutylene glycol) and a hydroxyl group-containing unsaturated monomers (e.g., 2-hydroxyl methacrylate); adducts between an unsaturated carboxylic acid and a monoepoxy compound; adducts between glycidyl (meth)acrylates (preferably methacrylate) and a monobasic acid (e.g., acetic acid, propionic acid, p-t-butylbenzonic acid or a fatty acid); monoesters or diesters between an acid anhydride group-containing unsaturated compounds (e.g., maleic anhydride or iraconic anhydride) and a glycol (e.g. ethylene glycol, 1,6-hexaediol or neopentyl glycol); chlorine-, bromine-, fluorine-, and hydroxyl group containing monomers such as 3-chloro-2-hydroxylpropyl (meth)acrylate (preferably methacrylate) and the like; C1–24 alkyl esters or cycloalkyl esters of (meth)acrylic acid (preferably methacrylic acid), such as methyl methacrylate, ethyl methacrylate, propyl methacrylate, isopropyl methacrylate, n-, sec-, or t-butyl methacrylate, hexyl methacrylate, 2-ethylhexyl methacrylate, octylmethacrylate, decyl methacrylate, lauryl methacrylate, stearyl methacrylate, cyclohexyl methacrylate and the like, C2–18 alkoxyalkyl esters of (meth)acrylic acid (preferably methacrylic acid), such as methoxybutyl methacrylate, methoxyethyl methacrylate, ethoxyethyl methacrylate, ethoxybutyl methacrylate and the like; olefines or dines compounds such as ethylene, propylene, butylene, isobutene, isoprene, chlororene, fluorine containing olefins, vinyl chloride, and the like; ring-containing unsaturated monomers such as styrene and o-,m-,p-substitution products thereof such as N,N-dimethylaminostyrene, aminostyrene, hydroxystyrene, t-butylstyrene, carboxystyrene and the like, a-methyl styrene, phenyl (meth)acrylates, nitro-containing alkyl (meth)acrylates such as N,N-dimethyl-aminoethyl methacrylate, N-t-butylaminoethyl methacrylate; 2-(dimethylamino)ethyl methacrylate, methyl chloride quaternized salt, and the like; polymerizable amides such as (meth)acrylamide, N-methyl(meth)acrylamide, 2-acryloamido-2-methyl-1-propanesulfonic acid, and the like; nitrogen-containing monomers such as 2-, 4-vinyl pyridines, 1-vinyl-2-pyrrolidone, (meth)acrylonitrile, and the like; glycidyl group-containing vinyl monomers such as glycidyl (meth)acrylates and the like, vinyl ethers, vinyl acetate, epoxides, cyclosiloxanes, cyclic ethers, cyclic imino ethers.

The preferred "ordinary" macromonomer include those defined in "Chemistry and Industry of Macromonomers" (Yamashita, Huthig & Wepf, New York ,1993).

The process of the present invention also may be used for the formation of a variety of prepolymers or precursors such as macromonomer and macro-initiator, which can further react with other monomers via a variety of step or chain polymerization processes with the formation of graft (comb) polymers, block copolymers, star polymers, crosslinking polymers, IPNs, semi-IPNs, and the like. In another preferred embodiment, the polymers prepared in the present invention may be used as multi-functional polymeric telogens in telomerization to make polymers with a variety of topological architectures such as block copolymer, graft copolymer, star polymer, branched and hyperbranched polymer, etc.

In another embodiment, the polymers prepared in the present invention can be used as polymeric coupling agents to make polymers with a variety of topological architectures such as block copolymer, graft copolymer, star polymer with hyperbranched nature.

In a further embodiment, the polymers prepared in accordance with the present invention can be used as a macro-initiator in various living or controlled polymerization such as atom transfer radical polymerization (Wang, J. Am. Chem. Soc.,), RAFT polymerization (Chiefari, Macromolecules, 31, 5559 (1998)), Inifieter radical and cationic polymerization (Otsu, T.; Eur. Polym. J., 31, 67 (1995)), and other non-living or non-controlled chain or condensation polymerization processes to make polymers with a variety of topological architectures such as block copolymer, graft copolymer, star polymer, branched and hyperbranched polymer, crosslinking polymers, gel, shell-core, etc.

In another embodiment, functional polymers such as multi-end functional polymers and in-chain functional polymers can be prepared with the present invention. Also, highly branched polymers with photographically useful end groups as described in U.S. Pat. No. 6,252,025 can be also made via present invention.

The polymers and copolymers prepared in the present invention can be used in a variety of applications such as plastics, elastomers, fibers, engineering resins, coatings, paints, adhesives, asphalt modifiers, detergents, diagnostic agents and supports, dispersants, emulsifiers, rheology modifiers, viscosity modifiers, in ink and imaging compositions, as leather and cements, lubricants, surfactant, as paper additives, as intermediates for chain extensions such as polyurethanes, as additives in inkjet, printing, optical storage, photography, photoresist, and coloration of polymer, as water treatment chemicals, cosmetics, hair products, personal care products, polymeric dyes, polymeric couplers, polymeric developers, antistatic agents, in food and beverage packaging, pharmaceuticals, carriers for drug and biological materials, slow release agent formulations, crosslinking agents, foams, deodorants, porosity control agents, complexing and chelating agents, carriers for chiral resolution agents, catalysts, carriers for gene transfection,

EXAMPLES

The invention can be better appreciated by reference to the following specific embodiments.

Sample 1

Preparation of allyl trichloroacetate (where A is CH$_2$=CH—, L is —CH$_2$—, and XY is —OC(O)CCl$_2$—Cl)

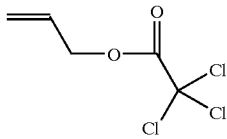

Allyl alcohol (100 ml, 1.47 mol) (Aldrich) was first charged into a three-neck flask along with a stir bar. Triethylamine (205 ml, 1.47 mol) (Aldrich) and dry methylene chloride (300 ml) are then added. The solution was placed in an ice-water bath and trichloroacetyl chloride (207 ml, 1.85 mol) was dropwise added to the solution over the course of 2 hours. After trichloroacetyl chloride was completely added, the ice bath was removed and the solution was allowed to stir overnight (18 hrs) at room temperature. The solution was washed with deionized water three times and the organic layer was dried with anhydrous magnesium sulfate. The product was collected by passing through a silica column eluted with 4:1 heptane:methylene chloride and removing the residual solvent through rotary evaporation. The product was obtained with a 95.3% yield based on allyl alcohol used.

Sample 2

Preparation of allyl tribromoacetate

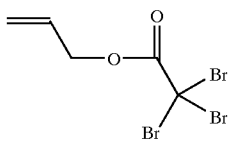

Except for using tribromoacetyl bromide instead of trichloroacetyl chloride, the synthetic procedure to make allyl tribromoacetate is similar to the one to make allyl trichloroacetate Sample 1.

Sample 3

Preparation of N-allyl trichloroacetamide

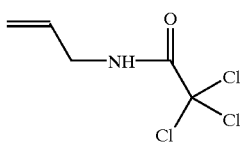

Except for using allyl amine instead of allyl alcohol, the synthetic procedure to make allyl trichloroamide is similar to the one to make allyl trichloroacetate Sample 1.

Sample 4

Preparation of (1-chloromethyl trichloroacetyl)ethyl acrylate)

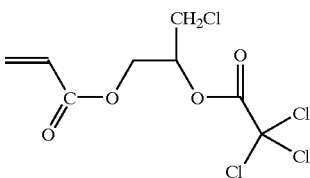

The glycidyl acrylate (50 g, 0.39 mol) (Aldrich), tetrabutylammonium chloride (1.09 g) (Aldrich), and 120 ml of dry toluene were first charged into a three-neck flask along with a stir bar. The solution was placed in an ice-water bath and trichloroacetyl chloride (54 ml, 0.48 mol) was dropwise added to the solution over the course of 2 hours. After trichloroacetyl chloride was completely added, the ice bath was removed and the solution was allowed to stir overnight (18 hrs) at room temperature. The solution was washed with deionized water three times and the organic layer was dried with anhydrous magnesium sulfate. The product was collected by passing through a silica column eluted with 4:1 heptane:methylene chloride and removing the residual solvent through rotary evaporation. The product was obtained with a 87% yield based on glycidyl acrylate used.

Sample 5

Preparation of Allyl (1-chloromethyl trichloroacetyl)ethyl ether

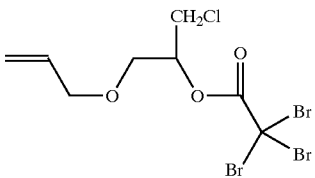

Except for using ally glycidyl ether and tribromoacetyl chloride instead of glycidyl acrylate and trichlorocetyl chloride, respectively, the synthetic procedure is similar to the one to make Sample 4.

Sample 6

Preparation of ((1-chloromethyl trichloroacetyl)ethyl methacrylate)

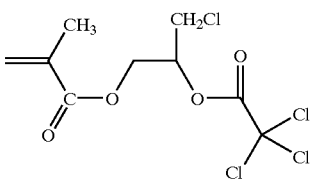

Except for using glycidyl methacrylate instead of glycidyl acrylate, the synthetic procedure is similar to the one to make Sample 4.

Sample 7
Preparation of Poly(ethylene glycol) (trichloromethanoate) methacrylate

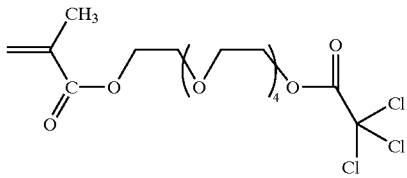

Except for using poly(ethylene glycol) methacrylate instead allyl alcohol, the synthetic procedure is similar to the one to make allyl trichloroacetate Sample 1.

Sample 8
Preparation of Poly(propylene glycol) (trichloromethanoate) acrylate

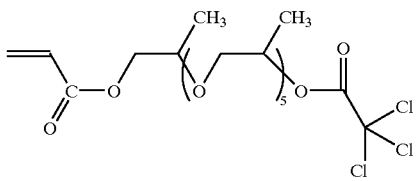

Except for using poly(propylene glycol) acrylate instead allyl alcohol, the synthetic procedure is similar to the one to make allyl trichloroacetate Sample 1.

Sample 9
Preparation of allyl trichloro-1,2-butoxylate-block-ethoxylate

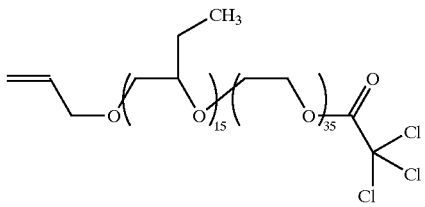

Except for using ally alcohol 1,2-butoxylate-block-ethoxylate instead allyl alcohol, the synthetic procedure is similar to the one to make allyl trichloroacetate Sample 1.

Sample 10

Preparation of 3-allyl 1,2-di(trichloroacetyl)propyl ether

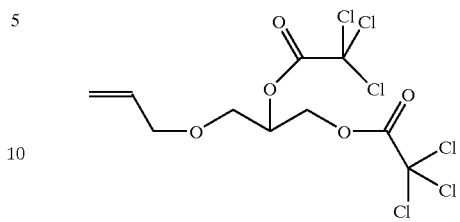

Except for using 3-allyloxy-1,2-propanediol instead allyl alcohol, the synthetic procedure is similar to the one to make allyl trichloroacetate Sample 1.

Example 1

Homopolymerzation of Allyl trichloroacetate

The following reagents were first added into an air-free flask equipped with a water condenser along with a stir bar:

| | |
|---|---|
| allyl trichloroacetate | 2.5 grams |
| benzoyl peroxide | 0.0476 grams |
| chlorobenzene | 1 ml |

The solution was then purged with pure nitrogen for 15 minutes. The polymerization was conducted at 100° C. for 18 hours. Polymer was recovered by precipitation from methanol. The conversion was 56% ($^1$H NMR) and molecular weight and molecular weight distribution were 3680 and 1.28 (GPC based on polystyrene calibration), respectively. The % of branching units in polymer is ca. 56% by means of $^{13}$C NMR.

The following reaction scheme is an example of how radical telomerization of allyl trichloroacetate may yield hyperbranched polymer in accordance with Example 1.

Initiation with radical initiator BPO:

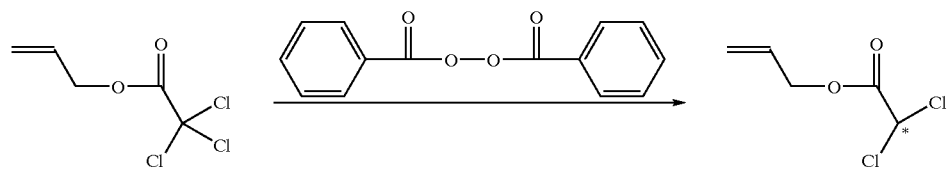

Propagation:

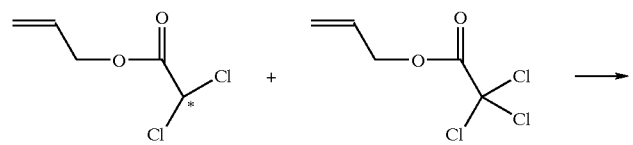

-continued
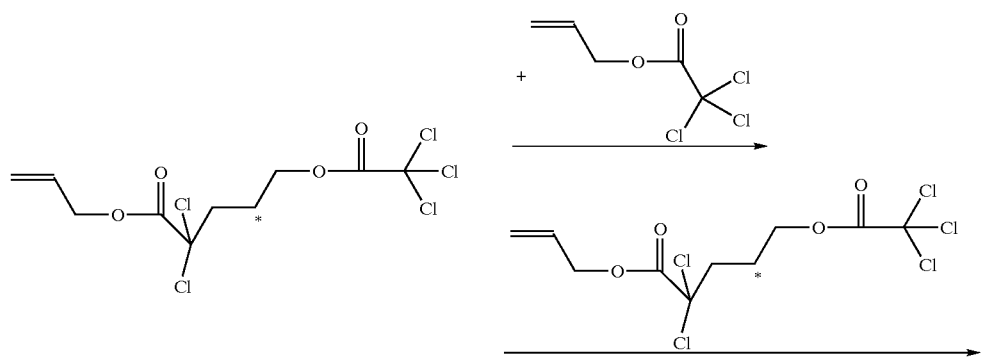
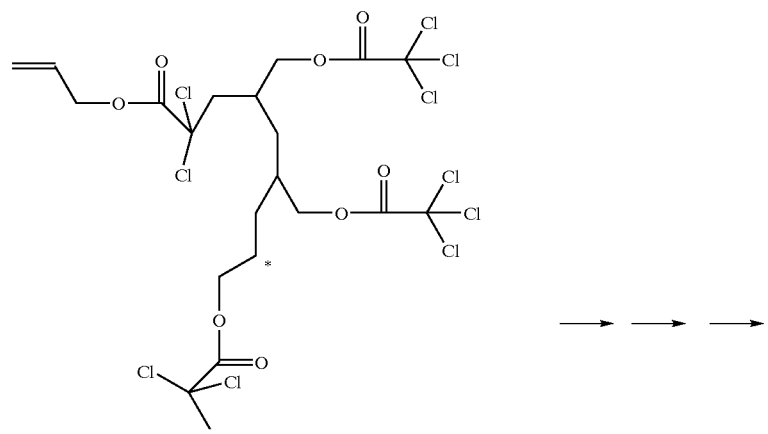
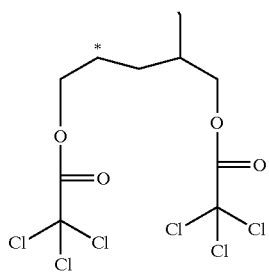
Chain transfer to -XY:
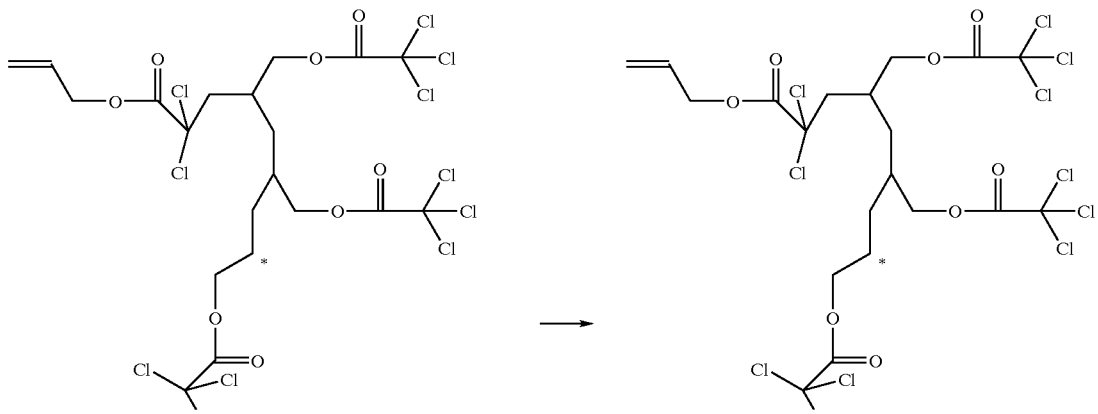

-continued

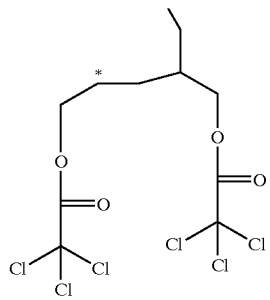

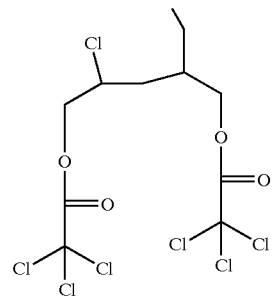

Termination: Combination of two radicals

Example 2
Homopolymerzation of N-Allyl trichloroacetamide

Polymerization was conducted under the same conditions as in example 1 except using allyl trichloroamide instead of allyl trichloroacetate. The conversion was 30% after 18 hours at 120° C. ($^1$H NMR) and molecular weight and molecular weight distribution were 862 and 1.37 (GPC based on polystyrene calibration), respectively.

Example 3
Homopolymerzation of Allyl tribromoacetate

The following reagents were first added into an air-free flask equipped with a water condenser along with a stir bar:

| allyl trichloroacetate | 2 grams |
| benzoyl peroxide | 0.024 grams |

The solution was then purged with pure nitrogen for 15 minutes. The polymerization was conducted at 100° C. for 8 hours. Polymer was recovered by precipitation from methanol. The conversion was 100% ($^1$H NMR) and molecular weight and molecular weight distribution were 1240 and 2.13 (GPC based on polystyrene calibration), respectively.

Example 4
Homopolymerzation of Allyl tribromoacetate

Polymerization was conducted under the same conditions as in example 3 except at 80° C. for 22.5 hours. The conversion was 100% ($^1$H NMR) and molecular weight and molecular weight distribution were 2220 and 3.10 (GPC based on polystyrene calibration), respectively. The % of branching units in polymer is ca. 20% by means of $^{13}$C NMR.

Example 5
Homopolymerzation of Allyl tribromoacetate

Polymerization was conducted under the same conditions as in example 3 except with the following reagents:

| allyl trichloroacetate | 2 g |
| CuCl | 22 mg |
| butyl nitrile | 0.5 ml |

Polymerization was conducted at 120° C. for 20 hours. The conversion was 100% ($^1$H NMR) and molecular weight and molecular weight distribution were 3680 and 1.28 (GPC based on polystyrene calibration), respectively.

Example 6
Homopolymerzation of Allyl (1-chloromethyl trichloroacetyl)ethyl ether The following reagents were first added into an air-free flask equipped with a water condenser along with a stir bar:

| allyl trichloroacetate | 2 grams |
| benzoyl peroxide | 0.024 grams |

The solution was then purged with pure nitrogen for 15 minutes. The polymerization was conducted at 100° C. for 8 hours. Polymer was recovered by precipitation from methanol. The conversion was 100% ($^1$H NMR) and molecular weight and molecular weight distribution were 1240 and 2.13 (GPC based on polystyrene calibration), respectively.

Example 7
Homopolymerzation of ally trichloro-1,2-butoxylate-block-ethoxylate Polymerization was conducted under the same conditions as in example 1 except using ally trichloro-1,2-butoxylate-block-ethoxylate instead of allyl trichloroacetate. The conversion was 80% and the molecular weight and molecular weight distribution were 15700 and 3.10 (GPC based on polystyrene calibration), respectively.

Example 8
Copolymerization of Allyl trichloroacetate and ally trichloroacetamide Polymerization procedure was similar to example 1 using the following formulation:

| allyl trichloroacetate | 1 gram |
| allyl trichloroacetamide | 1 gram |
| benzoyl peroxide | 0.0476 grams |
| chlorobenzene | 1 ml |

The polymerization was conducted at 125° C. for 21 hours. The conversion was 50% ($^1$H NMR) and molecular weight and molecular weight distribution were 1300 and 1.45 (GPC based on polystyrene calibration), respectively.

Example 9

Copolymerization of Allyl trichloroacetate and Methyl methacrylate

Polymerization procedure was similar to example 1 using the following formulation:

| | |
|---|---|
| allyl trichloroacetate | 2.5 gram |
| methyl methacrylate | 0.8 gram |
| benzoyl peroxide | 0.0715 grams |
| chlorobenzene | 1.5 ml |

The polymerization was conducted at 100° C. for 19 hours. The conversion was 45% for allyl trichloroacetate and 95% for methyl methacrylate (both based on $^1$H NMR) and molecular weight and molecular weight distribution were 6910 and 2.23 (GPC based on polystyrene calibration), respectively.

Example 10

Copolymerization of Allyl trichloroacetate and maleic anhydride

Polymerization procedure was similar to example 1 using the following formulation:

| | |
|---|---|
| allyl trichloroacetate | 3 grams |
| maleic anhydride | 1.5 grams |
| benzoyl peroxide | 0.0953 grams |
| chlorobenzene | 2 ml |

The polymerization was conducted at 120° C. for 18 hours. The conversion was 55% for allyl trichloroacetate and 95% for maleic anhydride (both based on $^1$H NMR) and molecular weight and molecular weight distribution were 1760 and 2.14 (GPC based on polystyrene calibration), respectively.

Example 11

Copolymerization of (1-chloromethyl trichloroacetyl)ethyl methacrylate) and maleic anhydride Polymerization procedure was similar to example 1 using the following formulation:

| | |
|---|---|
| (1-chloromethyl trichloroacetyl)ethyl methacrylate) | 2 grams |
| maleic anhydride | 2 grams |
| benzoyl peroxide | 0.0953 grams |
| chlorobenzene | 2 ml |

The polymerization was conducted at 120° C. for 18 hours. The conversion was 95% for (1-chloromethyl trichloroacetyl)ethyl methacrylate) and 85% for maleic anhydride (both based on $^1$H NMR) and molecular weight and molecular weight distribution were 3990 and 2.53 (GPC based on polystyrene calibration), respectively.

Example 12

Copolymerization of (1-chloromethyl trichloroacetyl)ethyl acrylate) and maleic anhydride Polymerization procedure was similar to example 1 using the following formulation:

| | |
|---|---|
| (1-chloromethyl trichloroacetyl)ethyl acrylate) | 2 grams |
| maleic anhydride | 2 grams |
| benzoyl peroxide | 0.0953 grams |
| chlorobenzene | 2 ml |

The polymerization was conducted at 120° C. for 15 hours. The conversion was 85% for (1-chloromethyl trichloroacetyl)ethyl acrylate) and 80% for maleic anhydride (both based on $^1$H NMR) and molecular weight and molecular weight distribution were 1930 and 2.02 (GPC based on polystyrene calibration), respectively.

Example 13

Copolymerization of ((1-chloromethyl trichloroacetyl)ethyl acrylate), maleic anhydride, and styrene Polymerization procedure was similar to example 1 using the following formulation:

| | |
|---|---|
| (1-chloromethyl trichloroacetyl)ethyl acrylate) | 2 grams |
| maleic anhydride | 0.32 grams |
| styrene | 0.35 grams |
| benzoyl peroxide | 0.0476 grams |
| chlorobenzene | 1 ml |

The polymerization was conducted at 110° C. for 2 hours. The conversion was 90%, 95%, and 90% for (1-chloromethyl trichloroacetyl) ethyl acrylate), styrene, and maleic anhydride (based on $^1$H NMR), respectively, and molecular weight and molecular weight distribution were 18500 and 2.59 (GPC based on polystyrene calibration), respectively.

Example 14

Copolymerization of 3-allyl 1,2-di(trichloroacetyl)propyl ether and maleic anhydride Polymerization procedure was similar to example 10 using the following formulation:

| | |
|---|---|
| 3-allyl 1,2-di(trichloroacetyl) propyl ether | 1 grams |
| maleic anhydride | 1 grams |
| benzoyl peroxide | 0.048 grams |
| chlorobenzene | 2 ml |

The polymerization was conducted at 120° C. for 18 hours. The conversion was 70% for 3-allyl 1,2-di (trichloroacetyl)propyl ether and 95% for maleic anhydride (both based on $^1$H NMR) and molecular weight and molecular weight distribution were 2900 and 2.5 (GPC based on polystyrene calibration), respectively.

Example 15
Chemical Modification of Poly(allyl trichloroacetate) with NaN$_3$ The following reagents were first added into an air-free flask equipped with a water condenser along with a stir bar:

| | |
|---|---|
| poly (allyl trichloroacetate) (Mn: 1300) | 0.5 grams |
| sodium azide | 0.1338 grams |
| tetrabutylammonium bromide | 0.0655 grams |
| dimethyl sulfoxide | 4 ml |

The solution was refluxed overnight. Polymer was recovered by precipitation from water. The conversion of Cl to N$_3$ was >90% ($^1$H NMR).

Example 16
Amidation of Poly((1-chloromethyl trichloroacetyl)ethyl methacrylate)/maleic anhydride/styrene)

The following reagents were first added into an air-free flask equipped with a water condenser along with a stir bar:

| | |
|---|---|
| poly ((1-chloromethyl trichloroacetyl) ethyl methacrylate)-co-maleic anhydride-co-styrene (Mn: 14100) | 0.25 grams |
| Jeffamine M-715 | 0.45 grams |
| tetrahydrofuran | 1 ml |

The polymerization was stirred at 45° C. for 18 hours. Polymer was recovered by precipitation from heptane. The final polymer was soluble in basic water.

Example 17
Atom Transfer Radical Polymerization of Methyl methacrylate Using Poly (allyl trichloroacetate) as Macro-initiator According to typical atom transfer radical polymerization procedure (Wang, Macromolecules, 28, 7901 (1995)). The following reagents were first added into an air-free flask equipped with a water condenser along with a stir bar:

| | |
|---|---|
| poly (allyl trichloroacetate) (Mn = 1300) | 0.25 g |
| Methyl methacrylate | 0.5 g |
| CuCl | 9.2 mg |
| 2,2'dipyridyl | 27.8 mg |
| toluene | 1 ml |

The solution was then purged with pure nitrogen for 15 minutes. The polymerization was conducted at 100° C. for 18 hours. Polymer was recovered by precipitation from methanol. The conversion was 100% ($^1$H NMR) and molecular weight and molecular weight distribution were 5000 and 1.5 (GPC based on polystyrene calibration), respectively.

Example 18
Preparation of Polymeric Coupler

The (allyl trichloroacetate-co-maleic anhydride) copolymer (0.5 grams) as prepared in example 10 was charged into a 25 ml round bottom flask along with a stir bar. 5 ml THF was added and the solution was stirred with N$_2$ purging through it. 0.05 grams of coupler intermediate with the following structure:

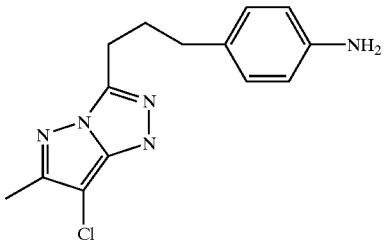

was first dissolved in 2 ml THF and then was dropwise added to polymer solution. The reaction was allowed at 45° C. for 14 hours. The final polymeric coupler was collected by precipitation from heptane and dried under vacuum. The final product is soluble in basic aqueous solution.

Example 19
Preparation of Polymeric Dye

The (allyl trichloroacetate-co-maleic anhydride) copolymer (0.5 grams) as prepared in example 10 was charged into a 10 ml round bottom flask along with a stir bar. 0.18 grams of Basic blue 47 (Aldrich) and 7 ml THF was added. The reaction was allowed 45° C. for 21 hours. The final polymeric dye was collected by precipitation from heptane and dried under vacuum. The final product is soluble in basic aqueous solution.

The invention has been described in detail with particular reference to certain preferred embodiments thereof, but it will be understood that variations and modifications can be effected within the spirit and scope of the invention.

What is claimed is:

1. A process for making hyperbranched polymers from $A_n$—$L_z(XY)_m$ type monomers wherein A is a polymerizable group moiety, XY is a telogen group moiety in which Y is a transferable atom or group which can participate in a transfer reaction with the formation of reactive X*, L is a linkage between A and XY, z is 0 or 1, and n and m are integers of at least 1, comprising
   (a) initiating reaction by forming activated species from reaction between either an A or an XY group of the $A_n$—$L_z(XY)_m$ type monomer and an external stimulus to form activated monomer species with an activated polymerizable group moiety A* or an activated moiety X* derived from the telogen group moiety XY; and
   (b) polymer segment chain growth by
      (i) propagation reaction between the polymerizable group A moieties of the $A_n$—$L_z(XY)_m$ type monomers with the activated moieties A* and X* of activated species, and further reaction between the polymerizable group moieties with the activated moieties of the reaction products thereof, and
      (ii) chain transfer reaction between the activated A* polymerizable group moieties of activated species or of polymer segments formed in (b)(i) with XY telogen group moieties of the $A_n$—$L_z(XY)_m$ type monomers or of polymer segments formed in (b)(i), whereby activated X* moieties and inactive A—Y moieties are formed by transfer of transferable atom or group Y of the telogen group moiety XY to the activated A* moiety;
   wherein the reaction rates of the (b)(i) propagation reaction and of the (b)(ii) chain transfer reaction are within 2 orders of magnitude of each other, such that the combination of propagation reaction and chain transfer reaction results in formation of a highly branched polymer from the $A_n$—$L_z(XY)_m$ type monomer.

2. A process according to claim 1, wherein n and m are each 1 or 2.

3. A process according to claim 1, wherein n is 1 and m is 1 or 2.

4. A process according to claim 1, wherein n and m are each 1.

5. A process according to claim 1, wherein the reaction rates of the (b)(i) propagation reaction and of the (b)(ii) chain transfer reaction are within one order of magnitude of each other.

6. A process according to claim 1, wherein A represents a vinylic, cyclic ether, siloxane, or cyclic imino ether group.

7. A process according to claim 1, wherein A represents a group of the formula:

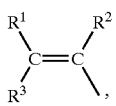

wherein $R^1$, $R^2$ and $R^3$ are independently selected from the group consisting of H, halogen, CN, straight or branched $C_1$–$C_{20}$ alkyl and $C_6$–$C_{20}$ aryl that may be substituted with halogen.

8. A process according to claim 1, wherein A represents a group of the formula: $CH_2$=CH—.

9. A process according to claim 1, wherein the transferable atom or group Y represents H, F, Cl, Br, I, $Li^+$, $Na^+$, $K^+$, $Cs^+$, OC=$NC_6H_4S$, $(Ph)_2R^4C$ (where $R^4$=CN, OPh, $OSiMe_3$), $R^5$ (where $R^5$=alkyl, aryl), $(R^5)_2NC$(=S)—S, $VR^5$ (where V=Se, Te), $R^5S$, $OR^5$, $Si(R^5)_3$, or O—$N(R^6)_2$ (where the two $R^6$ groups may be independently alkyl or aryl, or may be joined to form a heterocyclic ring).

10. A process according to claim 1, wherein the telogen group —XY represents —OM (where M is H, $Li^+$, $Na^+$, $K^+$, $Cs^+$), —$CZ_3$ (where Z=Cl, Br, I), —$CF_2Z$, —$CCl_2Br$, —$CBr_2Cl$, —OC(O)$CZ_2$, —C(O)—$Z_2$, —$CH_{2-q}Z_q$ (where q is an integer of 0-2), —C(O)$CH_{2-q}Z_q$, —C(O)O$CH_{2-q}Z_q$, —OC(O)$CH_{2-q}Z_q$, —$SO_2Cl$, $(R^5)_2NC$(=S)—S—S—C(=S)$N(R^5)_2$— (where $R^5$=alkyl, aryl), $R^5S$—$SR^5$—, $(R^5)_2NC$(=S)—S—$R^5$—, $R^5S$—$R^5$—, or —$R^5$—O—$N(R^6)_2$ (where the two $R^6$ groups may be independently alkyl or ayl, or may be joined to form a heterocyclic ring).

11. A process according to claim 1, wherein Y is H, Cl or Br, and XY represents a —OH, —$CCl_3$, —$CBr_3$, —$CCl_2Br$, —$CBr_2Cl$, —OC(O)$CBr_2$, or —OC(O)$CCl_2$ group.

12. A process according to claim 1, wherein z is 1 and L is a further substituted or unsubstituted straight or branched alkyl, alkylene, or aryl linking group.

13. A process according to claim 1, wherein z is 1 and L is an oligomeric or polymeric linking group.

14. A process according to claim 1, wherein the activated species formed in step (a) comprise free radical groups and the polymerization proceeds by free radical polymerization.

15. A process according to claim 1, wherein the $A_n$—$L_z(XY)_m$ type monomer comprises allyl trichloroacetate, allyl tribromoacetate, N-allyl trichloroacetamide, (1-chloromethyl trichloroacetyl)ethyl acrylate, Allyl (1-chloromethyl trichloroacetyl)ethyl ether, (1-chloromethyl trichloroacetyl)ethyl methacrylate, poly(ethylene glycol) (trichloromethanoate)methacrylate, poly(propylene glycol) (trichloromethanoate)acrylate, allyl trichloro-1,2-butoxylate-block-ethoxylate, or 3-allyl 1,2-di(trichloroacetyl)propyl ether.

* * * * *